US012282290B2

(12) United States Patent
Fukamachi et al.

(10) Patent No.: US 12,282,290 B2
(45) Date of Patent: Apr. 22, 2025

(54) PROCESS CARTRIDGE INCLUDING DRUM CARTRIDGE HAVING FIRST HOLDER, DEVELOPING CARTRIDGE HAVING SECOND HOLDER, AND PLATE FOR CONNECTING FIRST HOLDER AND SECOND HOLDER TO EACH OTHER

(71) Applicant: BROTHER KOGYO KABUSHIKI KAISHA, Nagoya (JP)

(72) Inventors: Yasuo Fukamachi, Nagoya (JP); Junya Sumida, Ama (JP); Kazutoshi Nakamura, Kuwana (JP); Hideshi Nishiyama, Owariasahi (JP); Shinya Kusuda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/535,203

(22) Filed: Dec. 11, 2023

(65) Prior Publication Data

US 2024/0103431 A1 Mar. 28, 2024

Related U.S. Application Data

(63) Continuation of application No. PCT/JP2022/022085, filed on May 31, 2022.

(30) Foreign Application Priority Data

Jun. 24, 2021 (JP) ................................ 2021-104531

(51) Int. Cl.
*G03G 21/18* (2006.01)

(52) U.S. Cl.
CPC ..... *G03G 21/1878* (2013.01); *G03G 21/1814* (2013.01); *G03G 21/1867* (2013.01); *G03G 21/1885* (2013.01)

(58) Field of Classification Search
CPC ............... G03G 15/0863; G03G 21/16; G03G 21/1652; G03G 21/18; G03G 21/1814;
(Continued)

(56) References Cited

U.S. PATENT DOCUMENTS

2018/0046131 A1 2/2018 Itabashi
2018/0314202 A1 11/2018 Yokoi
(Continued)

FOREIGN PATENT DOCUMENTS

EP 3287851 A1 2/2018
JP 8-101619 A 4/1996
(Continued)

OTHER PUBLICATIONS

International Preliminary Report on Patentability issued in the corresponding International Patent Application No. PCT/JP2022/022085, Dec. 14, 2023.
(Continued)

*Primary Examiner* — Sophia S Chen
(74) *Attorney, Agent, or Firm* — Merchant & Gould P.C.

(57) ABSTRACT

A process cartridge includes: a drum cartridge; a developing cartridge; and a plate. The drum cartridge includes: a drum frame; a photosensitive drum; a first holder; and a first memory having a first electrical contact surface that is movably supported by the first holder. The developing cartridge is attachable to the drum frame. The developing cartridge includes: a casing; a developing roller; a second holder; and a second memory having a second electrical contact surface that is movably supported by the second holder. The plate connects the first holder and the second holder to each other in a state where the developing cartridge is attached to the drum frame. The second holder moves together with the plate in accordance with movement of the first holder in a state where the plate connects the first holder and the second holder to each other.

13 Claims, 6 Drawing Sheets

(58) Field of Classification Search
CPC ........... G03G 21/1867; G03G 21/1878; G03G 21/1885; G03G 21/1889
See application file for complete search history.

(56) References Cited

U.S. PATENT DOCUMENTS

| | | | | |
|---|---|---|---|---|
| 2019/0278221 | A1 | 9/2019 | Saeki | |
| 2019/0391529 | A1 | 12/2019 | Abe et al. | |
| 2020/0310339 | A1 | 10/2020 | Yokoi et al. | |
| 2021/0063952 | A1* | 3/2021 | Mori .................. | G03G 21/1652 |
| 2021/0311411 | A1* | 10/2021 | Kusuda .............. | G03G 15/0863 |

FOREIGN PATENT DOCUMENTS

| | | | |
|---|---|---|---|
| JP | 2018-25677 | A | 2/2018 |
| JP | 2018-146829 | A | 9/2018 |
| JP | 2018-189740 | A | 11/2018 |
| JP | 2019-159048 | A | 9/2019 |
| JP | 2020-166090 | A | 10/2020 |
| JP | 2021-92647 | A | 6/2021 |

OTHER PUBLICATIONS

International Search Report issued in corresponding application PCT/JP2022/022085, completed on Jun. 23, 2022 and mailed on Jul. 5, 2022.

* cited by examiner

PROCESS CARTRIDGE INCLUDING DRUM CARTRIDGE HAVING FIRST HOLDER, DEVELOPING CARTRIDGE HAVING SECOND HOLDER, AND PLATE FOR CONNECTING FIRST HOLDER AND SECOND HOLDER TO EACH OTHER

REFERENCE TO RELATED APPLICATIONS

This is a by-pass continuation application of International Application No. PCT/JP2022/022085 filed May 31, 2022 which claims priority from Japanese Patent Application No. 2021-104531 filed Jun. 24, 2021. The entire contents of the International Application and the priority application are incorporated herein by reference.

BACKGROUND ART

Conventionally, an electro-photographic type image-forming apparatus such as a laser printer, an LED printer, or the like is known in the art. The conventional image-forming apparatus includes a developing cartridge, and a drum cartridge. The developing cartridge is attached to the drum cartridge. The drum cartridge to which the developing cartridge is attached is attached to the image-forming apparatus. Further, the developing cartridge in the conventional image-forming apparatus includes an IC chip. The IC chip stores therein various information related to the developing cartridge.

In order to prevent an electrical contact surface of the IC chip of the developing cartridge from wearing off at the time of attachment of the drum cartridge to which the developing cartridge is attached to the image-forming apparatus, the electrical contact surface of the IC chip of the developing cartridge is movable relative to a casing of the developing cartridge. Specifically, the developing cartridge includes a holder holding the electrical contact surface and movable relative to the casing of the developing cartridge, and an elastic member that can expand and contract in a moving direction of the holder.

SUMMARY

Recently, installation of an IC chip is required not only on a developing cartridge but also on a drum cartridge. In this case, it is conceivable that an electrical contact surface of the IC chip of the drum cartridge is enabled to move relative to a drum frame of the drum cartridge in order to prevent the electrical contact surface of the IC chip of the drum cartridge from wearing off at the time of attachment of the drum cartridge to which the developing cartridge is attached to an image-forming apparatus. Specifically, it is conceivable that the drum cartridge includes a holder holding the electrical contact surface and movable relative to the drum frame of the drum cartridge, and an elastic member that can expand and contract in a moving direction of the holder.

That is, an elastic member that can expand and contract in the moving direction of the holder is provided at both the developing cartridge and the drum cartridge. However, providing an elastic member at both the developing cartridge and the drum cartridge causes increase in an operation load for a user at the time of attachment of the drum cartridge to which the developing cartridge is attached to the image-forming apparatus.

In view of the foregoing, it is an object of the present disclosure to provide a technique installing a memory on a developing cartridge and a drum cartridge, and capable of reducing an operation load for a user at the time of attachment of the drum cartridge to which the developing cartridge is attached to an image-forming apparatus.

In order to attain the above and other object, the present disclosure provides a process cartridge including: a drum cartridge; a developing cartridge; and a plate. The drum cartridge includes: a drum frame; a photosensitive drum; a first memory; and a first holder. The photosensitive drum is rotatable about a first axis extending in a first direction. The first memory has a first electrical contact surface. The first memory stores therein information related to the drum cartridge. The first holder holds the first electrical contact surface such that the first electrical contact surface is movable relative to the drum frame in a second direction crossing the first direction. The developing cartridge is attachable to the drum frame. The developing cartridge includes: a casing; a developing roller; a second memory; and a second holder. The developing roller is rotatable about a second axis extending in the first direction. The second memory has a second electrical contact surface. The second memory stores therein information related to the developing cartridge. The second holder holds the second electrical contact surface such that the second electrical contact surface is movable relative to the casing. The plate connects the first holder and the second holder to each other in a state where the developing cartridge is attached to the drum frame. The second holder moves in the second direction together with the plate in accordance with movement of the first holder in the second direction in a state where the plate connects the first holder and the second holder to each other.

In the above structure, the second holder is enabled to move in the second direction together with the first holder. With such a structure, there is no need to provide an elastic member in the second holder, thereby reducing an operation load for a user at the time of attachment of the process cartridge to an image-forming apparatus.

DESCRIPTION

Figure 1:
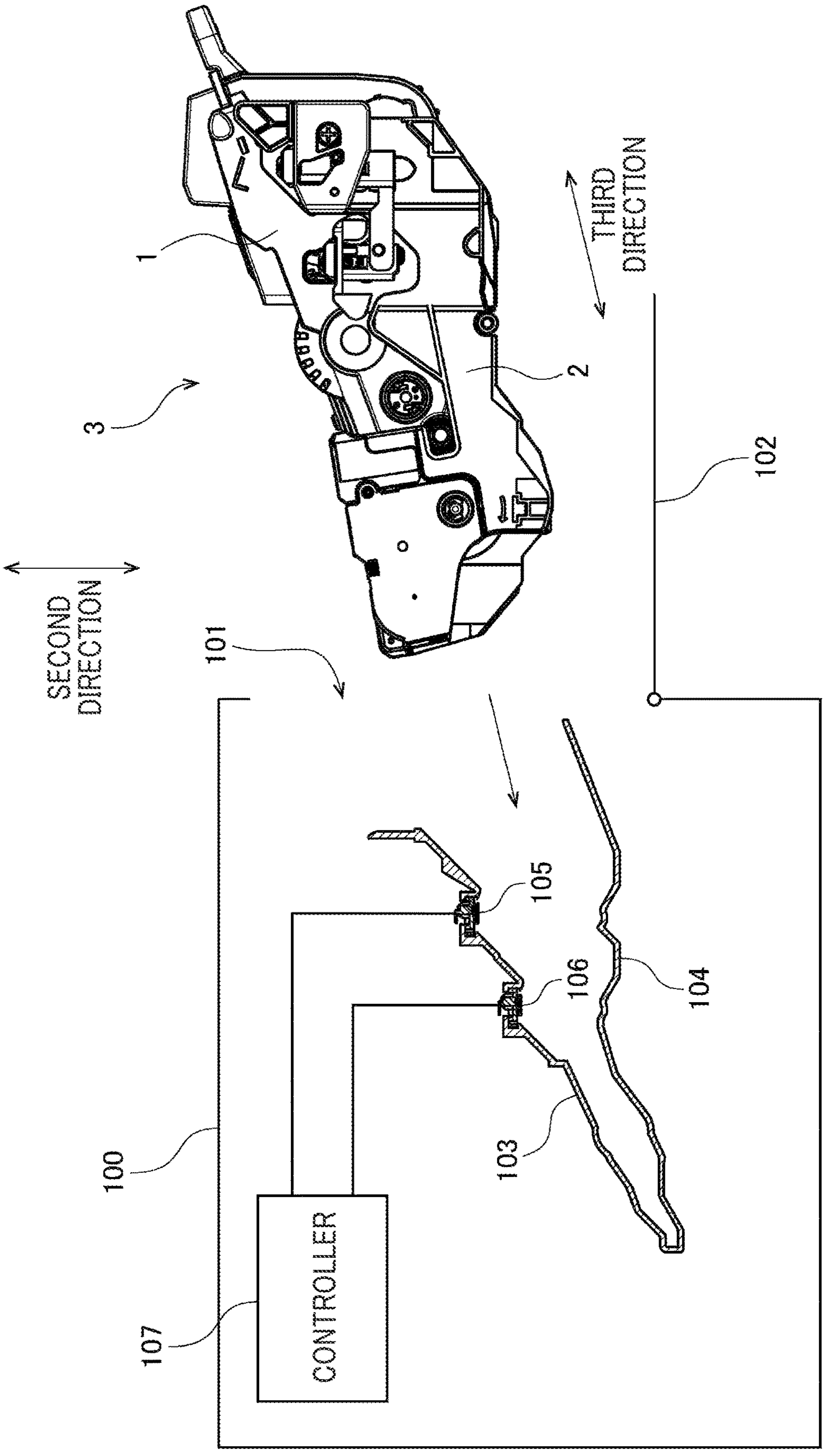
FIG. 1 is a view illustrating a process cartridge and an image-forming apparatus.

Hereinafter, one embodiment of the present disclosure will be described while referring to the drawings.

Incidentally, in the following description, a direction in which a photosensitive drum extends will be referred to "first direction". Further, a direction crossing a first electrical contact surface will be referred to as "second direction". Further, a direction in which one end of a drum frame at which the photosensitive drum is positioned and another end of the drum frame are arranged will be referred to as "third direction". The first direction and the second direction cross each other (preferably, are perpendicular to each other). The first direction and the third direction cross each other (preferably, are perpendicular to each other). The second direction and the third direction cross each other.

1. Overview of Image-Forming Apparatus

FIG. 1 is a view illustrating a process cartridge 3 and an image-forming apparatus 100.

The image-forming apparatus 100 is an electro-photographic type printer. The image-forming apparatus 100 is, for example, a laser printer or an LED printer. The process cartridge 3 is attachable to and detachable from the image-forming apparatus 100. As illustrated in FIG. 1, the process cartridge 3 includes a developing cartridge 1, and a drum cartridge 2. The developing cartridge 1 is attachable to and detachable from the drum cartridge 2. The image-forming apparatus 100 forms images on printing sheets using toner supplied from the developing cartridge 1.

2. Drum Cartridge

Figure 2:
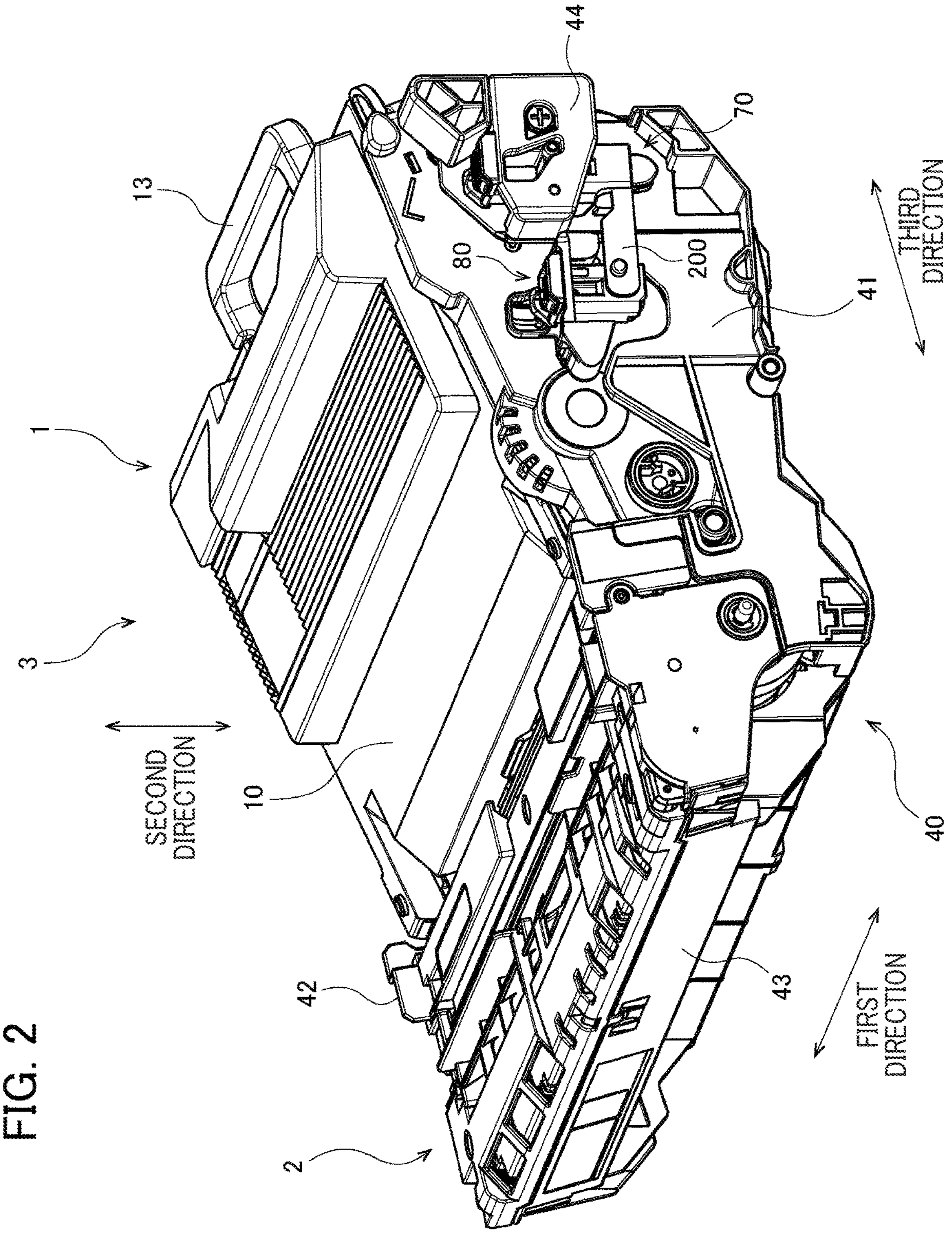
FIG. 2 is a perspective view of the process cartridge.
Figure 3:
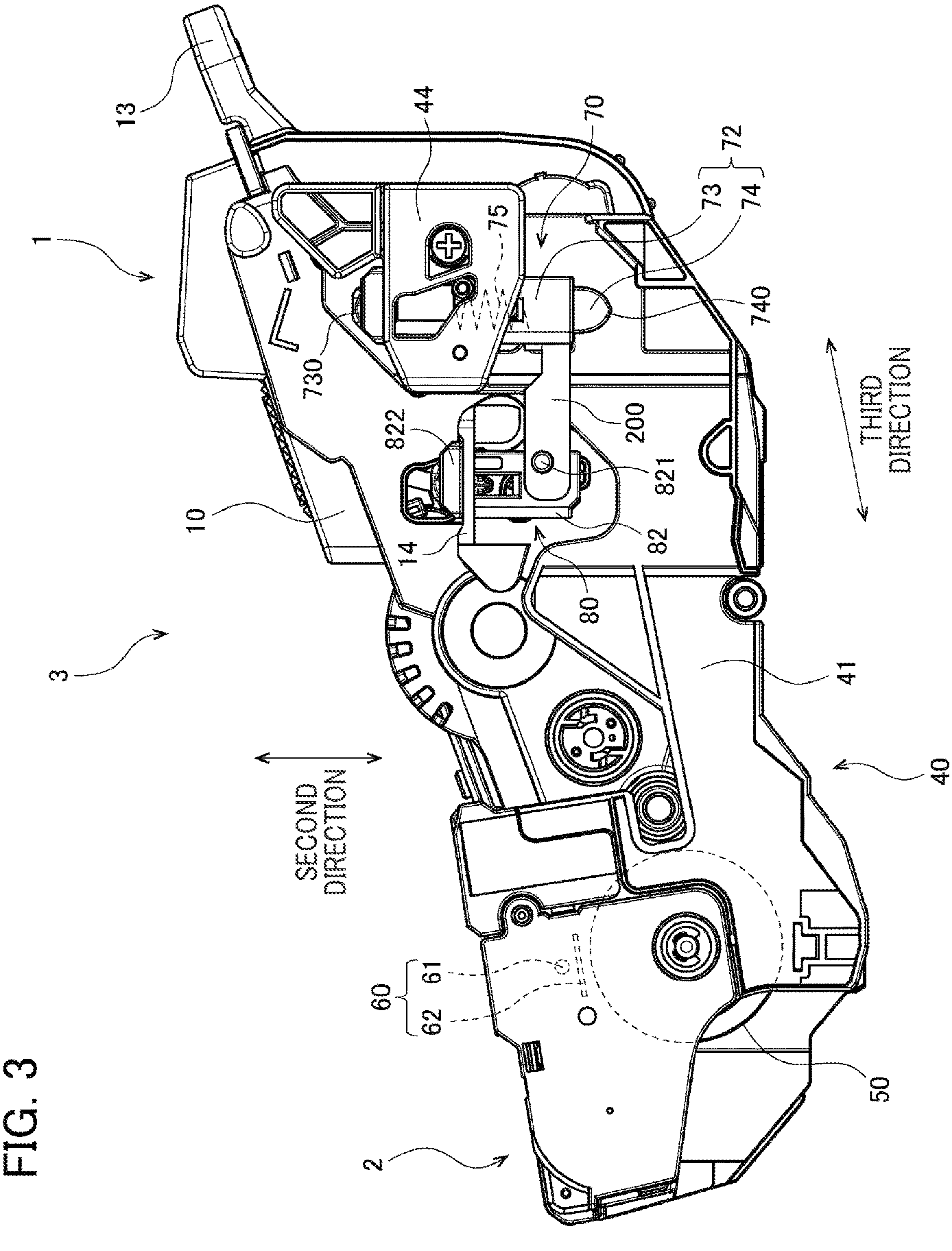
FIG. 3 is a side view of the process cartridge.

FIG. 2 is a perspective view of the process cartridge 3. FIG. 3 is a side view of the process cartridge 3. As illustrated in FIGS. 2 and 3, the drum cartridge 2 includes a drum frame 40, a photosensitive drum 50, a scorotron-type charger 60, and a first memory assembly 70.

The drum frame 40 is a frame that supports the photosensitive drum 50. The drum frame 40 includes a first side frame 41, a second side frame 42, and a connection frame 43. The first side frame 41 is positioned at one end portion of the drum frame 40 in the first direction. The second side frame 42 is positioned at another end portion of the drum frame 40 in the first direction. The first side frame 41 and the second side frame 42 are positioned away from each other in the first direction.

The first side frame 41 extends in a direction crossing the first direction. That is, the first side frame 41 extends in the second direction and the third direction. The second side frame 42 extends in a direction crossing the first direction. That is, the second side frame 42 extends in the second direction and the third direction. The connection frame 43 connects the first side frame 41 and the second side frame 42 to each other in the first direction.

The developing cartridge 1 is attachable to and detachable from the drum frame 40. In a state where the developing cartridge 1 is attached to the drum frame 40, the developing cartridge 1 is positioned between the first side frame 41 and the second side frame 42 in the first direction.

The photosensitive drum 50 is a drum that is rotatable about a rotation axis (a first axis) extending in the first direction. The photosensitive drum 50 is positioned between the first side frame 41 and the second side frame 42 in the first direction. Further, the photosensitive drum 50 is positioned at one end portion of the drum frame 40 in the third direction. The photosensitive drum 50 has a hollow cylindrical outer circumferential surface. The outer circumferential surface of the photosensitive drum 50 is coated with a photosensitive material. In a state where the process cartridge 3 is attached to the image-forming apparatus 100, the photosensitive drum 50 rotates due to a driving force supplied from the image-forming apparatus 100.

Note that the drum cartridge 2 may include a handle at another end of the drum frame 40 in the third direction.

The scorotron-type charger 60 is a device configured to charge the outer circumferential surface of the photosensitive drum 50. As illustrated in FIG. 3, the scorotron-type charger 60 faces the photosensitive drum 50 in the second direction. Specifically, the scorotron-type charger 60 includes a charge wire 61, and a charge grid 62. The charge wire 61 faces the outer circumferential surface of the photosensitive drum 50 in the second direction. The charge wire 61 extends in the first direction along the outer circumferential surface of the photosensitive drum 50. The charge grid 62 is positioned between the photosensitive drum 50 and the charge wire 61 in the second direction.

The image-forming apparatus 100 supplies a voltage between the charge wire 61 and the charge grid 62 in a state where the process cartridge 3 is attached to the image-forming apparatus 100. As a result, the outer circumferential surface of the photosensitive drum 50 is charged.

Figure 4:
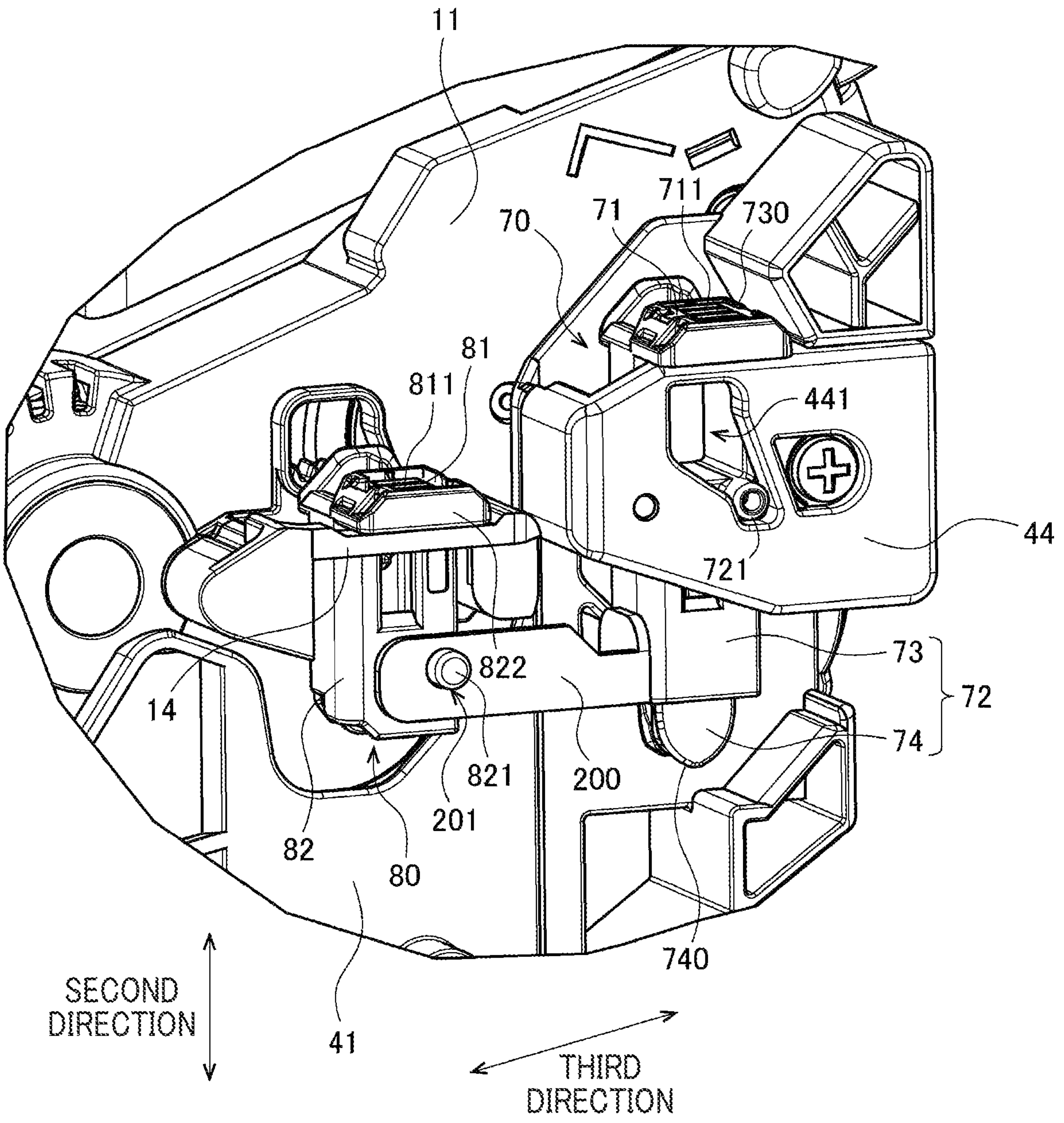
FIG. 4 is a partial perspective view of the process cartridge in the vicinity of a first memory assembly and a second memory assembly.

FIG. 4 is a partial perspective view of the process cartridge 3 in the vicinity of the first memory assembly 70 and a second memory assembly 80. The second memory assembly 80 will be described later. As illustrated in FIGS. 2 to 4, the first memory assembly 70 is positioned at the one end portion of the drum frame 40 in the first direction. Further, the first memory assembly 70 is positioned at an outer surface of the drum frame 40. Specifically, the first memory assembly 70 is positioned at an outer surface of the first side frame 41. In a state where the developing cartridge 1 is attached to the drum frame 40, the first memory assembly 70 is positioned on the opposite side of the first side frame 41 from the developing cartridge 1.

The first memory assembly 70 includes a first memory 71 which is a storage medium, and a first holder 72 holding the first memory 71. The first memory 71 is, for example, an IC chip. The first memory 71 is positioned at an outer surface of the first holder 72. The first memory 71 stores therein information related to the drum cartridge 2. Specifically, the first memory 71 stores therein at least one of identification information and lifetime information on the drum cartridge 2. The identification information is information for identifying the drum cartridge 2. The identification information is, for example, a manufacturing number of the drum cartridge 2. The lifetime information is information indicative of a service life of the drum cartridge 2. The lifetime information is, for example, the cumulative number of revolutions of the photosensitive drum 50.

The first memory 71 has a first electrical contact surface 711. The first electrical contact surface 711 is a surface of metal which is an electric conductor. The first electrical contact surface 711 is attached to the outer surface of the first side frame 41 through the first holder 72. Hence, the first electrical contact surface 711 is positioned at the outer surface of the first side frame 41.

As illustrated in FIGS. 2 to 4, the drum frame 40 includes a first holder cover 44. The first holder cover 44 is positioned at the outer surface of the first side frame 41. Specifically, the first holder cover 44 is fixed to the outer surface of the first side frame 41 with a screw. Note that the first holder cover 44 may be fixed to the outer surface of the first side frame 44 with a bolt. The first holder 72 is positioned between the first side frame 41 and the first holder cover 44 in the first direction.

The first holder 72 includes a first boss 721, and a second boss (not illustrated). The first boss 721 extends in the first direction toward the first holder cover 44 from a surface of the first holder 72 that faces the first holder cover 44. A shape of the first boss 721 may be a circular columnar shape, or may be a prismatic columnar shape. In the meantime, the first holder cover 44 has a first hole 441. The first hole 441 is a through-hole that penetrates the first holder cover 44 in the first direction. The first boss 721 is inserted in the first hole 441. However, the first holder cover 44 may have a recessed portion instead of the first hole 441 to allow the first boss 721 to be inserted therein.

The second boss extends in the first direction toward the first side frame 41 from a surface of the first holder 72 that faces the first side frame 41. A shape of the second boss may be a circular columnar shape, or may be a prismatic columnar shape. In the meantime, the first side frame 41 has a second hole (not illustrated). The second hole is a through-hole that penetrates the first side frame 41 in the first direction. The second boss is inserted in the second hole. However, the first side frame 41 may have a recessed portion instead of the second hole to allow the second boss to be inserted therein.

The first hole 441 has a size (an inner dimension) in the second direction that is greater than a size (an outer dimension) of the first boss 721 in the second direction. Hence, the first boss 721 is movable in the second direction within the first hole 441. Further, the second hole has a size (an inner dimension) in the second direction that is greater than a size (an outer dimension) of the second boss in the second direction. Hence, the second boss is movable in the second direction within the second hole. Accordingly, the first holder 72 is movable together with the first boss 721 and the second boss in the second direction relative to the drum frame 40 and the first holder cover 44. When the first holder 72 moves in the second direction relative to the drum frame 40, the first electrical contact surface 711 of the first memory 71 also moves in the second direction relative to the drum frame 40.

The first holder 72 has a first outer surface 730, and a second outer surface 740. The first outer surface 730 is positioned at one end of the first holder 72 in the second direction. The second outer surface 740 is positioned at another end of the first holder 72 in the second direction. The second outer surface 740 is movable in the second direction relative to the first outer surface 730.

Specifically, the first holder 72 according to the present embodiment includes a first holder member 73, a second holder member 74, and a first coil spring 75 interposed therebetween. The first holder member 73 is made of, for example, resin. The second holder member 74 is made of, for example, resin. The first holder member 73 has the first outer surface 730. The first memory 71 is fixed to the first outer surface 730. Hence, the first electrical contact surface 711 is positioned at the one end of the first holder 72 in the second direction. The second holder member 74 has the second outer surface 740. The first outer surface 730 and the second outer surface 740 are positioned away from each other in the second direction.

The first coil spring 75 is an elastic member that extends in the second direction. The first coil spring 75 is positioned between the first outer surface 730 and the second outer surface 740 in the second direction. One end of the first coil spring 75 in the second direction is connected to the first holder member 73. Another end of the first coil spring 75 in the second direction is connected to the second holder member 74.

The first coil spring 75 expands and contracts in the second direction at least between a first state and a second state that is more contracted than the first state. The first coil spring 75 in the first state has a length in the second direction that is greater a length in the second direction of the first coil spring 75 in the second state. Hence, a distance in the second direction between the first outer surface 730 and the second outer surface 740 in the first state is greater than a distance in the second direction between the first outer surface 730 and the second outer surface 740 in the second state. Further, the length in the second direction of the first coil spring 75 at least in the second state is shorter than a natural length of the first coil spring 75. The first coil spring 75 is an example of the first elastic member.

Note that the drum cartridge 2 may include a lock lever at the other end portion of the drum frame 40 in the first direction. The lock lever is pivotally movable about a pivot axis extending in the first direction relative to the drum frame 40 between a lock position and a release position. The lock lever is positioned at the lock position when the developing cartridge 1 is attached to the drum frame 40. Hence, the developing cartridge 1 is locked relative to the drum frame 40. Further, when the lock lever pivotally moves from the lock position to the release position in a state where the developing cartridge 1 is attached to the drum frame 40, lock of the developing cartridge 1 relative to the drum frame 40 is released.

3. Developing Cartridge

Figure 5:
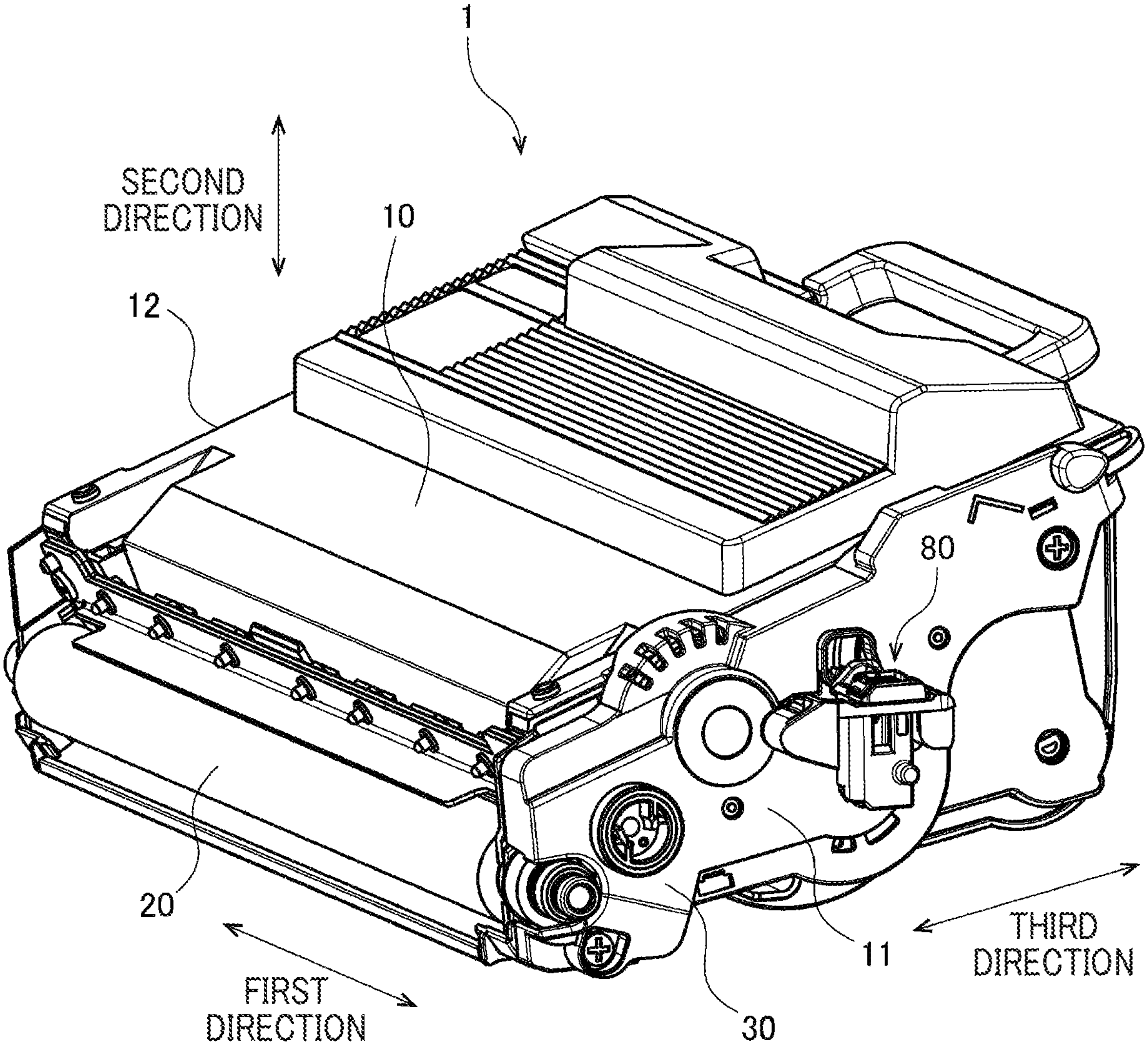
FIG. 5 is a perspective view of a developing cartridge.
Figure 6:
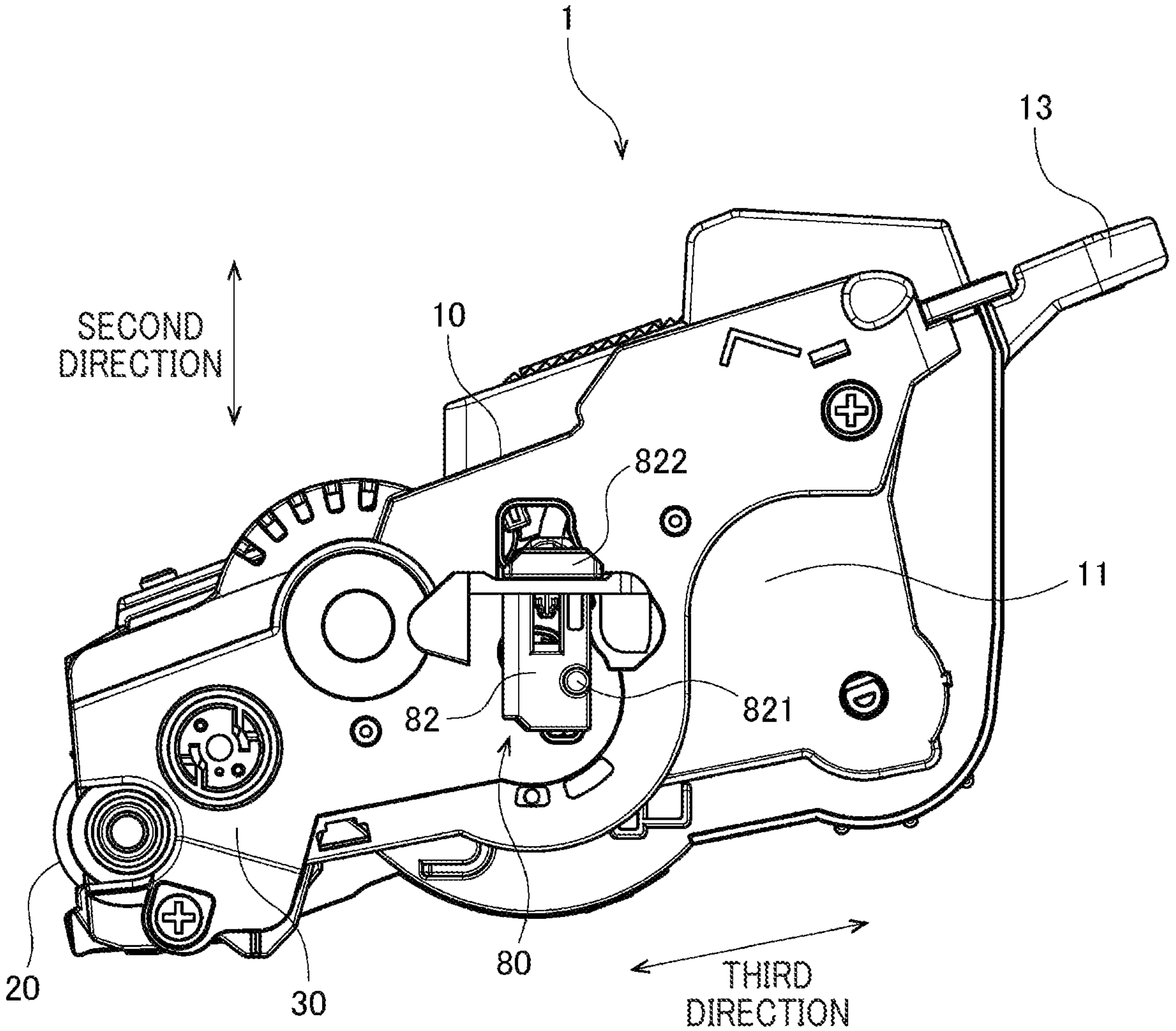
FIG. 6 is a side view of the developing cartridge.

FIG. 5 is a perspective view of the developing cartridge 1. FIG. 6 is a side view of the developing cartridge 1. As illustrated in FIGS. 5 and 6, the developing cartridge 1 includes a casing 10, a developing roller 20, a gear portion 30, and the second memory assembly 80. The casing 10 has a first outer surface 11, and a second outer surface 12. The first outer surface 11 is positioned at one end of the casing 10 in the first direction. The second outer surface 12 is positioned at another end of the casing 10 in the first direction. The first outer surface 11 and the second outer surface 12 are positioned away from each other in the first direction.

In a state where the developing cartridge 1 is attached to the drum frame 40, the first outer surface 11 of the developing cartridge 1 and the first side frame 41 of the drum cartridge 2 face each other in the first direction. Further, in a state where the developing cartridge 1 is attached to the drum frame 40, the second outer surface 12 of the developing cartridge 1 and the second side frame 42 of the drum cartridge 2 face each other in the first direction.

Developing agent is accommodated inside the casing 10. The developing agent is, for example, toner. The developing roller 20 is roller that is rotatable about a rotation axis (a second axis) extending in the first direction. The developing roller 20 is positioned at one end of the casing 10 in the third direction. The developing roller 20 and the photosensitive drum 50 face each other in the third direction in a state where the developing cartridge 1 is attached to the drum frame 40. Specifically, an outer circumferential surface of the developing roller 20 and the outer circumferential surface of the photosensitive drum 50 make contact with each other in a state where the developing cartridge 1 is attached to the drum frame 40.

The developing agent in the casing 10 is supplied to the outer circumferential surface of the developing roller 20 through a supply roller (not illustrated). Hence, the developing agent is carried on the outer circumferential surface of the developing roller 20. Then, the developing agent on the outer circumferential surface of the developing roller 20 is supplied to the photosensitive drum 50 of the drum cartridge 2. At this time, the developing agent moves from the developing roller 20 to the photosensitive drum 50 corresponding to an electrostatic latent image formed on the outer circumferential surface of the photosensitive drum 50. Hence, an image with the developing agent is formed on the outer circumferential surface of the photosensitive drum 50.

Note that the developing cartridge 1 includes a handle 13 at another end of the casing 10 in the third direction.

The gear portion 30 is positioned at the first outer surface 11 of the casing 10. The gear portion 30 includes a plurality of gears. In a state where the process cartridge 3 is attached to the image-forming apparatus 100, the image-forming apparatus 100 supplies a driving force to the developing roller 20 through the plurality of gears of the gear portion 30, whereby the developing roller 20 rotates.

The second memory assembly 80 is positioned at one end portion of the casing 10 in the first direction. Specifically, the second memory assembly 80 is positioned at the first outer surface 11 of the casing 10. As illustrated in FIG. 4, the second memory assembly 80 includes a second memory 81 which is a storage medium, and a second holder 82 holding the second memory 81. The second memory 81 is, for example, an IC chip. The second memory 81 is positioned at an outer surface of the second holder 82.

The second memory 81 stores therein information related to the developing cartridge 1. Specifically, the second memory 81 stores therein at least one of identification information and lifetime information on the developing cartridge 1. The identification information is information for identifying the developing cartridge 1. The identification information is, for example, a manufacturing number of the developing cartridge 1. The lifetime information is information indicative of a service life of the developing cartridge 1. The lifetime information is, for example, the cumulative number of revolutions of the developing roller 20.

The second memory 81 has a second electrical contact surface 811. The second electrical contact surface 811 is a surface of metal which is an electric conductor.

As illustrated in FIG. 4, the casing 10 includes a second holder cover 14. The second holder cover 14 is positioned at the first outer surface 11 of the casing 10. Specifically, the second holder cover 14 is fixed to the first outer surface 11 of the casing 10 with a screw. Incidentally, the second holder cover 14 may be fixed to the first outer surface 11 of the casing 10 with a bolt. The second holder 82 is positioned between the first outer surface 11 and the second holder cover 14 in the first direction.

The second holder 82 includes a third boss 821, and a fourth boss 822. The third boss 821 and the fourth boss 822 extends in a direction away from the casing 10 along the first direction from the second holder 82. The second holder cover 14 is positioned between the third boss 821 and the fourth boss 822 in the second direction. A gap in the second direction between the third boss 821 and the fourth boss 822 is greater than a dimension of the second holder cover 14 in the second direction. With such a dimensional relationship, the third boss 821 and the fourth boss 822 are movable in the second direction relative to the second holder cover 14. Accordingly, the second holder 82 is movable in the second direction together with the third boss 821 and the fourth boss 822 relative to the casing 10 and the second holder cover 14. When the second holder 82 moves in the second direction relative to the casing 10, the second electrical contact surface 811 of the second memory 81 also moves in the second direction relative to the casing 10.

The second holder 82 is configured of a single component. The second holder 82 is made of, for example, resin. A distance between one end of the second holder 82 in the second direction and another end of the second holder 82 in the second direction is constant. The second memory 81 is fixed to the one end of the second holder 82 in the second direction. Hence, the second electrical contact surface 811 is positioned at the one end of the second holder 82 in the second direction.

In a state where the developing cartridge 1 is attached to the drum frame 40, the second memory assembly 80 is exposed to an outside from the drum frame 40. Further, in a state where the developing cartridge 1 is attached to the drum frame 40, the first memory assembly 70 and the second memory assembly 80 are positioned at one end of the process cartridge 3 in the first direction. The first memory assembly 70 and the second memory assembly 80 are arranged in the third direction. The first memory assembly 70 and the second memory assembly 80 are positioned away from each other in the third direction. The second memory assembly 80 is positioned closer to the photosensitive drum 50 than the first memory assembly 70 is to the photosensitive drum 50 in the third direction.

4. Plate

The process cartridge 3 further includes a plate 200. The plate 200 is a component for connecting the first holder 72 and the second holder 82 to each other in a state where the developing cartridge 1 is attached to the drum frame 40. The plate 200 extends in the third direction. The plate 200 is attached to the first holder 72 and the second holder 82 in a state where the developing cartridge 1 is attached to the drum frame 40. The plate 200 is positioned at the one end portion of the drum frame 40 in the first direction.

One end of the plate 200 in the third direction is connected to the second holder 82. Specifically, the plate 200 has a through-hole 201. The through-hole 201 penetrates the one end in the third direction of the plate 200 in the first direction. The third boss 821 is inserted in the through-hole 201. Accordingly, the one end of the plate 200 in the third direction is connected to the second holder 82. Alternatively, instead of the through-hole 201, the plate 200 may have a recessed portion allowing the third boss 821 to be inserted therein.

Note that a boss may be provided at the one end of the plate 200 in the third direction, and a through-hole or a recessed portion may be formed in the second holder 82. In this case, the boss of the plate 200 may be inserted in the through-hole or the recessed portion of the second holder 82 so that the one end of the plate 200 in the third direction is connected to the second holder 82. Further, the one end of the plate 200 in the third direction may be fixed to the second holder 82 by adhesive agent or double-sided tape.

Another end of the plate 200 in the third direction is connected to the first holder 72. Specifically, the other end of the plate 200 in the third direction is connected to the first holder member 73. Specifically, the other end of the plate 200 in the third direction is fixed to the first holder member 73 by, for example, adhesive agent or double-sided tape. Thus, the first holder member 73 and the second holder 82 are connected to each other through the plate 200.

Note that a boss for fixing may be provided at the first holder 72, and a through-hole or a recessed portion may be formed in the other end of the plate 200 in the third direction. The other end of the plate 200 in the third direction may be connected to the first holder 72 by inserting the boss of the first holder 72 in the through-hole or the recessed portion of the plate 200.

Alternatively, a boss may be provided at the other end of the plate 200 in the third direction, and a through-hole or a recessed portion may be formed in the first holder 72. In this case, the other end of the plate 200 in the third direction may be connected to the first holder 72 by inserting the boss of the plate 200 in the through-hole or the recessed portion of the first holder 72.

When the first holder 72 moves in the second direction in a state where the developing cartridge 1 is attached to the drum frame 40 and the plate 200 connects the first holder 72 and the second holder 82 to each other, the plate 200 also moves in the second direction, and the second holder 82 also moves in the second direction together with the plate 200. More specifically, when the first holder member 73 moves in the second direction, the plate 200 also moves in the second direction, and the second holder 82 also moves in the second direction together with the plate 200.

In other words, when the first holder member 73 moves in the second direction, the other end of the plate 200 in the third direction also moves in the second direction. When the other end of the plate 200 in the third direction moves in the second direction, the one end of the plate 200 in the third direction also moves in the second direction. When the one end of the plate 200 in the third direction moves in the second direction, the second holder 82 also moves in the second direction.

5. Attachment Operation of Process Cartridge

The image-forming apparatus 100 has an opening 101 allowing the process cartridge 3 to pass therethrough, and includes a main cover 102. The main cover 102 pivotally moves between a closed position in which the main cover 102 covers the opening 101 of the image-forming apparatus 100 and an open position in which the main cover 102 opens the opening 101 of the image-forming apparatus 100. When the process cartridge 3 is attached to the image-forming apparatus 100, the main cover 102 is positioned at the open position, and the process cartridge 3 passes through the opening 101 and is attached to an inside of the image-forming apparatus 100. At this time, the process cartridge 3 moves in the third direction.

As illustrated in FIG. 1, the image-forming apparatus 100 includes a first guide frame 103, a second guide frame 104, a first electrical connector 105, and a second electrical connector 106. Each of the first guide frame 103 and the second guide frame 104 extends in the third direction. The first guide frame 103 and the second guide frame 104 face each other in the second direction. Further, a gap in the second direction between the first guide frame 103 and the second guide frame 104 decreases as extending away from the opening 101 in the third direction.

The first electrical connector 105 and the second electrical connector 106 are positioned at the first guide frame 103. The first electrical connector 105 and the second electrical connector 106 are arranged to be spaced apart from each other in the third direction. The first electrical connector 105 is a terminal that can make contact with the first electrical contact surface 711 of the first memory 71. The second electrical connector 106 is a terminal that can make contact with the second electrical contact surface 811 of the second memory 81. The first electrical connector 105 and the second electrical connector 106 are electrically connected to a controller 107 of the image-forming apparatus 100.

When the process cartridge 3 is attached to the image-forming apparatus 100, the first outer surface 730 of the first holder 72 makes contact with the first guide frame 103, and the second outer surface 740 of the first holder 72 makes contact with the second guide frame 104. The first holder 72 moves in the second direction relative to the drum frame 40 as the first holder 72 is guided by the first guide frame 103 and the second guide frame 104 while moving in the third direction. Further, since the gap in the second direction between the first guide frame 103 and the second guide frame 104 is gradually reduced, the distance in the second direction between the first outer surface 730 and the second outer surface 740 also becomes gradually reduced.

At this time, the second holder 82 moves in the second direction together with the plate 200 in accordance with movement of the first holder member 73 in the second direction. That is, the second holder 82 moves in the second direction without receiving any direct pressing force from the first guide frame 103 and the second guide frame 104.

When attachment of the process cartridge 3 to the image-forming apparatus 100 is completed, the first electrical contact surface 711 of the first memory 71 makes contact with the first electrical connector 105. As such, the controller 107 of the image-forming apparatus 100 can read information from the first memory 71 and write information into the first memory 71. Also, when the attachment of the process cartridge 3 to the image-forming apparatus 100 is completed, the second electrical contact surface 811 of the second memory 81 makes contact with the second electrical connector 106. Hence, the controller 107 of the image-forming apparatus 100 can read information from the second memory 81 and write information into the second memory 81.

As described above, the process cartridge 3 according to the present embodiment includes the plate 200 that connects the first holder 72 and the second holder 82 to each other. This structure can move the second holder 82 in the second direction together with the first holder 72 at the time of the attachment of the process cartridge 3 to the image-forming apparatus 100. With the structure described above, the second holder 82 does not require a component that directly receives a pressing force from the second guide frame 104. Specifically, a component like the second holder member 74 of the first holder 72 need not be provided in the second holder 82. Further, there is no need to provide an elastic member for expanding and contracting the second holder 82 in the second direction. Specifically, a component such as the first coil spring 75 of the first holder 72 need not be provided in the second holder 82. Accordingly, the number of components in the second holder 82 can be reduced, thereby reducing the number of components in the developing cartridge 1.

Also, the number of elastic members compressed when the process cartridge 3 is attached to the image-forming apparatus 100 is reduced in comparison with a case where an elastic member is provided in both the first holder 72 and the second holder 82, thereby lowering an operation load for the user.

6. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, the first holder 72 holds the first memory 71. However, the first holder 72 may hold only the first electrical contact surface 711 among the first memory 71. In this case, a portion of the first memory 71 other than the first electrical contact surface 711 may be held by another portion of the drum cartridge 2.

Further, in the embodiment described above, the second holder 82 holds the second memory 81. However, the second holder 82 may hold only the second electrical contact surface 811 among the second memory 81. In this case, a portion of the second memory 81 other than the second electrical contact surface 811 may be held by another portion of the developing cartridge 1.

Further, in the embodiment described above, the single process cartridge 3 is attached to the single image-forming apparatus 100. However, a plurality of process cartridges 3 may be attached to the single image-forming apparatus 100.

Further, a detailed shape of the process cartridge may be different from a shape illustrated in each drawing of the present application. Further, each component appearing in the embodiment and the modifications described above may be suitably combined as long as any contradiction is avoided.

What is claimed is:

1. A process cartridge comprising:
a drum cartridge including:
a drum frame;
a photosensitive drum rotatable about a first axis extending in a first direction;
a first memory having a first electrical contact surface, the first memory storing therein information related to the drum cartridge; and
a first holder holding the first electrical contact surface such that the first electrical contact surface is movable relative to the drum frame in a second direction crossing the first direction;
a developing cartridge attachable to the drum frame, the developing cartridge including:
a casing;
a developing roller rotatable about a second axis extending in the first direction;
a second memory having a second electrical contact surface, the second memory storing therein information related to the developing cartridge; and
a second holder holding the second electrical contact surface such that the second electrical contact surface is movable relative to the casing; and
a plate connecting the first holder and the second holder to each other in a state where the developing cartridge is attached to the drum frame,
wherein the second holder moves in the second direction together with the plate in accordance with movement of the first holder in the second direction in a state where the plate connects the first holder and the second holder to each other.

2. The process cartridge according to claim 1,
wherein the first holder includes:
a first holder member holding the first electrical contact surface;
a second holder member movable in the second direction relative to the first holder member; and
a first elastic member that can expand and contract in the second direction,
wherein one end of the first elastic member in the second direction is connected to the first holder member, and
wherein another end of the first elastic member in the second direction is connected to the second holder member.

3. The process cartridge according to claim 2,
wherein the first elastic member is a spring.

4. The process cartridge according to claim 2,
wherein the plate is a plate connecting the first holder member and the second holder to each other, and
wherein the second holder moves in the second direction together with the plate in accordance with movement of the first holder member in the second direction in a state where the plate connects the first holder member and the second holder to each other.

5. The process cartridge according to claim 4,
wherein the process cartridge is attachable to and detachable from an image-forming apparatus, and
wherein the second holder is movable in the second direction together with the plate in accordance with the movement of the first holder member in the second direction at the time of attachment of the process cartridge to the image-forming apparatus.

6. The process cartridge according to claim 1,
wherein one end of the plate is connected to the second holder, and
wherein another end of the plate is connected to the first holder.

7. The process cartridge according to claim 1,
wherein the first electrical contact surface and the first holder are positioned at one end portion of the drum frame in the first direction,
wherein the second electrical contact surface and the second holder are positioned at one end portion of the casing in the first direction, and
wherein the plate is positioned at the one end portion of the drum frame in the first direction.

8. The process cartridge according to claim 1,
wherein the process cartridge is attachable to and detachable from an image-forming apparatus, and
wherein, at the time of attachment of the process cartridge to the image-forming apparatus,
the first holder moves in the second direction relative to the drum frame, and
the second holder moves in the second direction together with the plate in accordance with the movement of the first holder in the second direction.

9. The process cartridge according to claim 1,
wherein the first holder holds the first memory.

10. The process cartridge according to claim 1,
wherein the second holder holds the second memory.

11. The process cartridge according to claim 1,
wherein the photosensitive drum is positioned at one end portion of the drum frame in a third direction crossing the first direction, and
wherein the first electrical contact surface and the second electrical contact surface are arranged in the third direction in a state where the developing cartridge is attached to the drum frame.

12. The process cartridge according to claim 11,
wherein the second electrical contact surface is positioned closer to the photosensitive drum than the first electrical contact surface is to the photosensitive drum in the third direction in a state where the developing cartridge is attached to the drum frame.

13. The process cartridge according to claim 11,
wherein the photosensitive drum faces the developing roller in the third direction in a state where the developing cartridge is attached to the drum frame.

* * * * *